United States Patent [19]

Takamizawa et al.

[11] Patent Number: 4,550,151
[45] Date of Patent: Oct. 29, 1985

[54] ORGANOBOROSILICON POLYMER AND A METHOD FOR THE PREPARATION THEREOF

[75] Inventors: Minoru Takamizawa; Taishi Kobayashi; Akira Hayashida; Yoshihumi Takeda, all of Niigata, Japan

[73] Assignee: Shin-Etsu Chemical Co., Ltd., Tokyo, Japan

[21] Appl. No.: 678,221

[22] Filed: Dec. 5, 1984

[30] Foreign Application Priority Data

Dec. 5, 1983 [JP] Japan .................................. 58-230346

[51] Int. Cl.$^4$ ............................................. C08G 79/08
[52] U.S. Cl. ............................................. 528/7; 528/5; 528/28
[58] Field of Search ................................. 528/5, 7, 28

[56] References Cited

U.S. PATENT DOCUMENTS 2,885,370 5/1959 Groszos et al. ..................... 528/7
3,288,726 11/1966 Wagner et al. ..................... 528/7

Primary Examiner—Melvyn I. Marquis
Attorney, Agent, or Firm—Toren, McGeady, Stanger, Goldberg & Kiel

[57] ABSTRACT

The invention provides a novel organoborosilicon polymer comprising two types of the recurring monomeric units represented by the general formulas of, one, $-SiR^1{}_2-CH_2-$ and, the other, $-BR^2-NR^3-$, in which $R^1$, $R^2$ and $R^3$ are each a hydrogen atom or a monovalent hydrocarbon group. Such an organoborosilicon polymer is readily prepared by the thermal decomposition polymerization reaction of an organopolysilane compound and a borazine compound at 250° to 500° C. and useful as a precursor of an inorganic ceramic material or inorganic fibers or as a binder of ceramics.

4 Claims, 4 Drawing Figures

ORGANOBOROSILICON POLYMER AND A METHOD FOR THE PREPARATION THEREOF

BACKGROUND OF THE INVENTION

The present invention relates to a novel organoborosilicon polymer or, more particularly, to a novel organoborosilicon polymer of which the main chain is composed of the elements of silicon, carbon, boron and nitrogen and also relates to a method for the preparation of such a novel polymer.

In recent years, a variety of organosilicon polymers and copolymers have been developed and preparation of ceramic materials mainly composed of silicon carbide in the form of, for example, fibers is proposed starting with such an organosilicon polymer by the thermal decomposition polymerization or pyrolysis thereof. Several methods have been disclosed including, for example, a method in which a cyclic or linear organopolysilane is heated at a temperature of 300° to 2000° C. to effect pyrolysis and polycondensation thereof giving a high-molecular polycarbosilane (see Japanese Patent Publication No. 57-26527), a method in which such a high-molecular polycarbosilane is subjected to spinning and infusibilization to give fibers of silicon carbide (see Japanese Patent Publications Nos. 57-53892 and 57-56566) and a method in which such a polycarbosilane is used as a binder of ceramic materials (see Japanese Patent Kokai No. 52-40509). Further, attempts have been made to introduce another metallic or metalloid element into the polycarbosilane compound including a method to introduce a structure of borosiloxane (see Japanese Patent Kokai No. 54-61299), a method to introduce a structure of titanium alkoxide (see Japanese Patent Kokai No. 56-74126) and a method to introduce a structure of zirconoalkoxide (see Japanese Patent Kokai No. 56-92923) and possibilities are proposed to utilize such a modified compound for the preparation of inorganic fibers or as a binder of ceramic materials in just the same manner as the unmodified polycarbosilane compounds.

From the standpoint of industrial production, however, the known methods for the preparation of a polycarbosilane compound involve several disadvantages and difficulties. While a polycarbosilane is produced by the treatment of a polysilane in a pressurizable vessel such as an autoclave under a high pressure of 80 to 130 atmospheres and at a high temperature of 400° to 480° C. in a batch-wise reaction or by the heat treatment for 20 to 50 hours at a high temperature of 600° to 800° C. in a circulation-type reactor, the yield of the desired polycarbosilane is usually low and the reaction vessel or reactor must withstand the above mentioned reaction conditions prolongedly. With an object to present a solution for these problems, an improved method is proposed in Japanese Patent Kokai No. 57-83529 in which a polysilane is first converted into a low-molecular polycarbosilane which is then polymerized into a high-molecular polycarbosilane compound but such a method can afford no true solution of the problems because of the decreased productivity due to the complicated reaction process.

A problem in the above described method of introducing another metallic or metalloid element into a polycarbosilane is the relatively inferior properties, in particular, at high temperatures of the inorganic fibers and the ceramic materials prepared therefrom or therewith. The reason therefor is that the heteroatoms such as boron, titanium and zirconium introduced into the polycarbosilane formed of the linkage of —Si—C— in the main chain are always connected to the silicon atom through an intervening oxygen atom forming the linkages of —Si—O—B—, —Si—O—Ti— or —Si—O—Zr— so that the resultant inorganic fibers and ceramic materials necessarily contain such oxide linkages.

SUMMARY OF THE INVENTION

An object of the present invention is therefore to provide a novel organosilicon-based polymeric compound free from the above described problems and disadvantages in the polycarbosilane and related compounds in the prior art.

Another object of the invention is to provide a unique method for the preparation of such an organosilicon-based polymeric compound.

The novel organosilicon-based polymeric compound of the invention is an organoborosilicon polymer composed of two types of recurring monomeric units of which the monomeric units of the first type are represented by the general formula $-SiR^1_2-CH_2-$, in which each of the groups denoted by $R^1$ is a hydrogen atom or a monovalent hydrocarbon group selected from the class consisting of methyl, ethyl, vinyl and phenyl groups independently from the other, and the monomeric units of the second type are represented by the general formula $-BR^2-NR^3-$, in which $R^2$ is a monovalent hydrocarbon group, a trihydrocarbylsilyl-substituted alkyl group of the formula $-(CH_2)_nSIR^4_3$, $R^4$ being a monovalent hydrocarbon group and n being a positive integer, or a substituted or unsubstituted amino group of the formula $-NR^5_2$, $R^5$ being a hydrogen atom or a monovalent hydrocarbon group, and $R^3$ is a monovalent hydrocarbon group, to form the main chain of the polymer composed of the elements of silicon, carbon, boron and nitrogen and the molar ratio of the silicon atoms to the boron atoms therein is preferably in the range from 2:1 to 200:1.

The method of the present invention for the preparation of the above described novel organoborosilicon polymer comprises reacting an organosilicon compound or, preferably, a polysilane compound having, in a molecule, at least one silicon-to-silicon linkage and at least one group denoted by the symbol $R^1$, $R^1$ having the meaning as defined above, and an organoboron compound composed of the units represented by the general formula $-BR^2-NR^3-$, in which $R^2$ and $R^3$ each have the meaning as defined above, in an inert atmosphere at a temperature in the range from 250° to 500° C. to effect thermal decomposition and polycondensation reaction thereof, in which the molar ratio of the silicon atoms to the boron atoms is preferably in the range from 2:1 to 200:1.

DETAILED DESCRIPTION OF THE PREFERRED EMBODIMENTS

Figure 1:
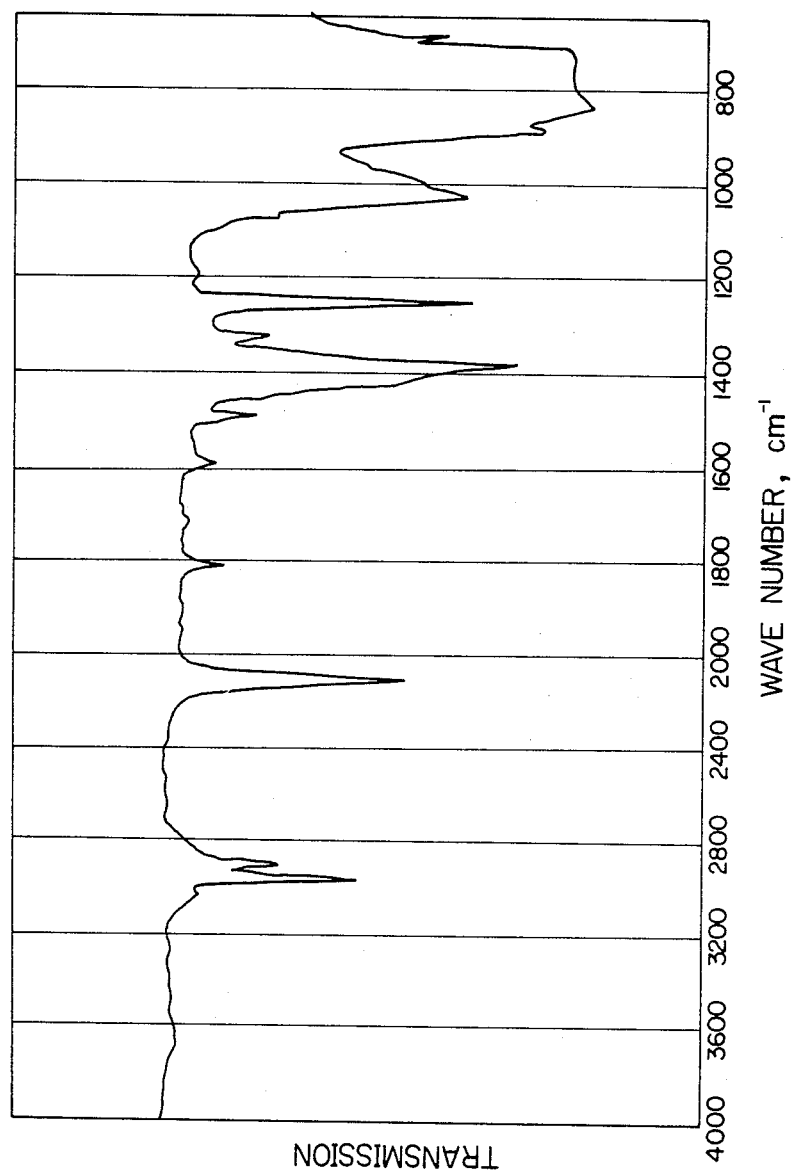
FIGS. 1 and 2 are the infrared absorption spectrum and the elution diagram in the gel permeation chromatography, respectively, of the reaction product obtained in Example 1.

The above described novel organoborosilicon polymer and the method for the preparation thereof according to the invention have been completed as a result of the extensive investigations undertaken on the base of the discovery that the reaction of a polysilane compound and an organoboron compound defined above can proceed rapidly at a relatively low temperature even under normal pressure to give an organoborosilicon polymer within a short reaction time and the product polymer contains no oxide linkage in the main chain which is composed of the elements of silicon, carbon, boron and nitrogen to further develop the investigations for the preferable relative contents of the silicon and boron atoms in the polymer having desirable properties as well as for the conditions under which the reaction proceeds efficiently.

As is described above, the organoborosilicon polymer of the invention is composed of the two types of the recurring monomeric units. The monomeric unit of the first class is a divalent silmethylene group and represented by the general formula $-SiR^1{}_2-CH_2-$, in which $R^1$ is a hydrogen atom or a monovalent hydrocarbon group selected from the class consisting of methyl, ethyl, vinyl and phenyl groups and each of the groups $R^1$ in a molecule can be selected therefrom independently from the others. The monomeric unit of the second class, on the other hand, is represented by the general formula $-BR^2-NR^3-$, in which $R^2$ is a monovalent hydrocarbon group, which may be an alkyl group such as methyl, ethyl and propyl groups, an alkenyl group such as vinyl and allyl groups, an aryl group such as phenyl and tolyl groups or a cycloalkyl group such as cyclohexyl group, a trihydrocarbylsilyl-substituted alkyl group of the formula $-(CH_2)_nSiR^4{}_3$, $R^4$ and n each having the meaning defined above, such as trimethylsilylmethyl and 2-(trimethylsilyl)ethyl groups or a substituted or unsubstituted amino group such as amino, dimethylamino, diethylamino and monophenylamino groups. As is mentioned above, the molar ratio of the silicon atoms to the boron atoms in this organoborosilicon polymer should preferably be in the range from 2:1 to 200:1. This is because the sintered product of the polymer may have less characteristic properties of silicon carbide when this molar ratio is smaller than 2:1 while a molar ratio of Si:B larger than 200:1 may result in the loss of the advantages that the reaction can proceed under moderate conditions at room temperature under normal pressure within a relatively short time. The organoborosilicon polymer of the invention is a liquid of a low to high viscosity or a solid depending on the reaction conditions of temperature and time for the preparation thereof. When the intended application of the organoborosilicon polymer is as a binder for ceramic materials or a coating agent or as a starting material for the preparation of inorganic fibers, the polymer should have an average molecular weight in the range from about 500 to about 100,000.

One of the starting reactants for the preparation of the inventive organoborosilicon polymer is an organopolysilane compound having at least one silicon-to-silicon linkage in a molecule exemplified by, preferably, those polysilane compounds having a cyclic, linear or three-dimensionally crosslinked molecular structure and obtained by the reaction of a diorganodichlorosilane and metallic sodium and the methyl polysilane compounds mainly composed of the units of $(CH_3)_2Si=$ and $CH_3Si$ and derived from the methyl chlorodisilane compounds formed as the byproducts in the so-called direct synthesis for the preparation of methyl chlorosilanes by the reaction of metallic silicon and methyl chloride (see, for example, Japanese Patent Publication No. 55-49621 and Japanese Patent Kokai Nos. 57-34130 and 57-34131). These polysilane compounds can be used either singly or as a mixture of two kinds or more according to need.

The organoboron compound to be reacted with the above mentioned polysilane compound should have a skeletal structure expressed by the unit formula $-BR^2-NR^3-$, in which $R^2$ and $R^3$ each have the meaning defined before. Although the molecular structure of the organoboron compound can be either cyclic or linear, it is preferably a borazine compound represented by the general formula $(-BR^2-NR^3-)_3$ or cyclic structural formula

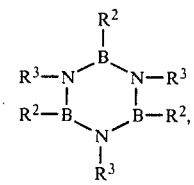

in which $R^2$ and $R^3$ each have the same meaning as above, and described in detail in U.S. Pat. Nos. 2,892,869, 2,917,543, 2,954,401 and 2,954,402 in view of the easiness in the synthetic preparation. These borazine compounds can of course be used either singly or as a mixture of two kinds or more according to need.

The reaction of the above described organopolysilane compound and the organoboron compound can be performed by merely blending the compounds and heating the mixture in an atmosphere of an inert gas. Although the exact reaction conditions depend on the types of the polysilane compound and the organoboron compound as well as the blending ratio thereof, it is usually performed at a temperature from 250° to 500° C. under normal pressure and the reaction is usually complete within 1 to 10 hours. It is of course optional to perform the reaction under a pressurized condition of, for example, up to 20 atmospheres.

It is presumable that the thermal decomposition and polycondensation reaction of the reactant compounds by heating may lead to the formation of linkages of the type of $-Si-CH_2-B-N-$ or $-Si-B-N-$ involving a part of the silicon atoms in the starting polysilane compound with subsequent polymerization of these structures to give the desired organoborosilicon polymer. Further it is presumable that the organoboron compound as one of the reactants may serve as a catalyst so that the reaction can proceed and be completed even at a relatively low temperature within a short reaction time to readily give the organoborosilicon polymer of which the main chain is composed of the elements of silicon, carbon, boron and nitrogen as a result of the quantitative incorporation of the elements of boron and nitrogen originally contained in the starting organoboron compound.

In the following, exemplary descriptions are first given for the preparation of the methylpolysilanes and the borazine compounds as the starting reactants and then for the preparation and characterization of the inventive organoborosilicon polymers. In the following description, the symbols Me and Ph denote a methyl and a phenyl group, respectively.

Preparation 1

A dispersion of 23.7 g (1.03 moles) of metallic sodium in 300 ml of xylene was heated at 110° C. under vigorous agitation and 64.5 g (0.5 mole) of dimethyl dichlorosilane were slowly added thereto dropwise followed by further heating of the reaction mixture under gentle reflux of xylene. After completion of the reaction, the precipitates were collected by filtration and washed first with methyl alcohol and then with water followed by drying to give 53.4 g of a white powdery product which was identified to be a dimethyl polysilane of the formula $(Me_2Si)_n$. The above mentioned yield of the product was 92% of the theoretical value.

Preparation 2

A mixture of 400 g of a high-boiling disilane fraction composed of 59.3% by weight of dimethyl tetrachlorodisilane and 40.7% by weight of trimethyl trichlorodisilane obtained as the byproduct in the direct reaction of methyl chloride and metallic silicon for the synthesis of methyl chlorosilane compounds and 1.2 g of HMPA (hexamethylphosphoramide) was gradually heated with agitation to effect the decomposition condensation reaction and, when 190 g of the methyl chlorosilane mixture had been distilled out, the reaction was terminated by decreasing the temperature of the reaction mixture.

Thereafter, the reaction mixture left in the reaction vessel was added to an ether solution containing 4 moles of methyl magnesium chloride dissolved therein whereby the silicon-bonded chlorine atoms remaining in the reaction mixture were methylated to give 111 g of a liquid methyl polysilane having a viscosity of 47.6 centistokes at 25° C. and an average molecular weight of about 850. The above mentioned yield of the product was 77.1% of the theoretical value.

Preparation 3

A mixture of 200 ml of toluene and 46.8 g of boron chloride $BCl_3$ dissolved therein under chilling with ice water was agitated and a solution of 28.4 g of aniline in 100 ml of toluene was added thereto dropwise so that white precipitates were formed in the mixture. When the reaction mixture was further agitated for 10 hours under reflux of toluene, the white precipitates disappeared and the mixture was converted into a clear, light brown solution from which 200 ml of toluene were removed by distillation followed by cooling to give 30.6 g of white needle-like crystals of $(ClBNPh)_3$ melting at 270° C.

Then, this material was dissolved in tetrahydrofuran and methylated by adding a tetrahydrofuran solution of methyl magnesium chloride thereto and, after completion of the reaction, tetrahydrofuran was removed from the mixture by distillation followed by the extraction of the residue with hot toluene. The toluene extract was washed with a saturated aqueous solution of ammonium chloride and, after dehydration, admixed with methyl alcohol to give white precipitates. Recrystallization of the white precipitates from hexane gave 16.9 g of a borazine compound of the formula $(MeBNPh)_3$, i.e. B-trimethyl-P-triphenyl borazine, melting at 268° C. The above mentioned yield of this product was 65% of the theoretical value.

Substantially the same experimental procedures as above were undertaken excepting the replacement of the aniline with methylamine and methyl magnesium chloride with different kinds of Grignard reagents to give several other borazine compounds of the formulas including: $(CH_2=CHBNPh)_3$ melting at 188° C.; $(C_2H_5BNPh)_3$ melting at 170° C.; $(Me_3SiCH_2CH_2BNPh)_3$ melting at 158° C.; and $(Me_3SiCH_2BNMe)_3$ melting at 60° C.

EXAMPLE 1

Into a four-necked flask equipped with a thermometer, stirrer, discharge tube for volatile matter by distillation and inlet tube for an inert gas were introduced 200 g of the dimethyl polysilane prepared in Preparation 1 described above and 20 g of B-trimethyl-N-triphenyl borazine prepared in Preparation 3 described above and the mixture was gradually heated. When the temperature of the mixture in the flask had reached about 250° C., a reaction of thermal decomposition and polymerization was started as indicated by the formation of a volatile matter as a distillate and the mixture was converted into a clear liquid. Thereafter, the temperature of the reaction mixture was further increased gradually up to 380° C. and the reaction was continued at this temperature for 2 hours followed by cooling of the reaction mixture to give 143 g of a clear, yellowish green resinous material melting at 135° to 142° C. The elementary analysis of this material gave a result that the contents of silicon, boron and nitrogen therein were 41.3%, 1.23% and 1.50%, respectively, to indicate that the product was an organoborosilicon polymer in which the molar ratio of silicon to boron was 12.9:1 and the contents of boron and nitrogen were close to the theoretical values. The above mentioned yield of this resinous product was 65% of the theoretical value.

Figure 2:
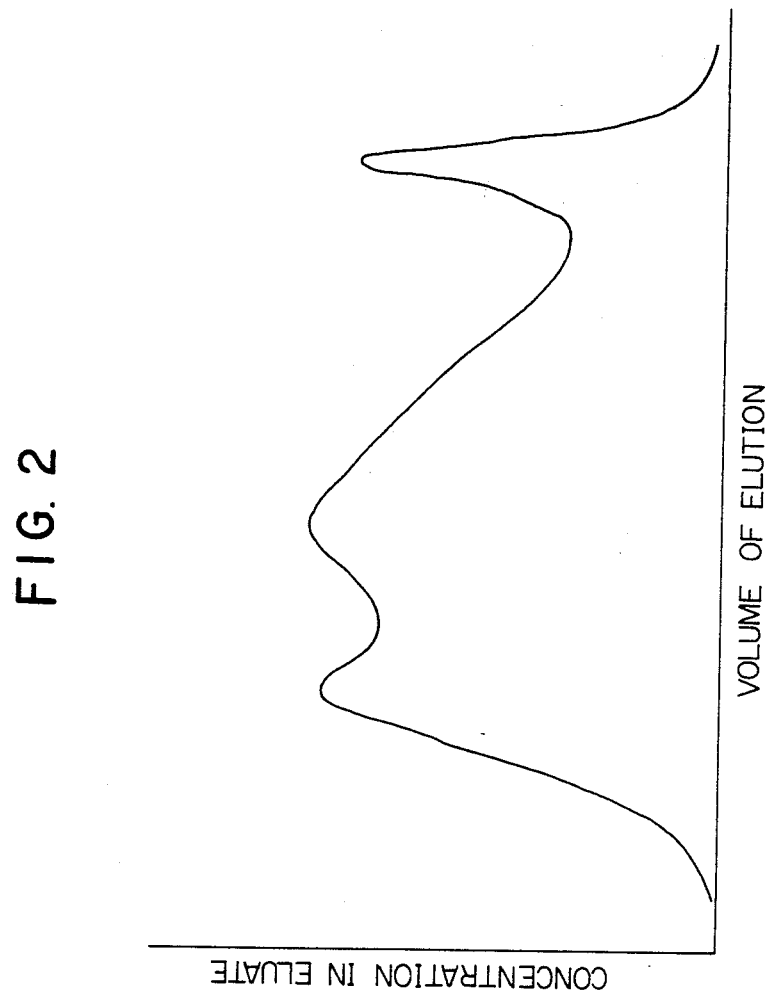

The number-average molecular weight of this polymer was 2230 as determined by the method of vapor pressure osmosis and the infrared absorption spectrum thereof was as shown in FIG. 1 of the accompanying drawing having characteristic absorption bands appearing at wave lengths of 2100 cm$^{-1}$ assignable to Si—H, 1390 cm$^{-1}$ assignable to B—N, 1260 cm$^{-1}$ assignable to Si—Me, 1030 and 1330 cm$^-$ assignable to Si—CH$_2$—Si, 1500 and 1600 cm$^{-1}$ assignable to the benzene nucleus and 1820 cm$^{-1}$ assignable to B—C. The intensity ratio of the absorption bands of Si—H at 2100 cm$^{-1}$ to Si—Me at 1260 cm$^{-1}$ was 0.703. The elution diagram of this polymer by the gel permeation chromatography was as shown in FIG. 2.

EXAMPLE 2

Into the same reaction vessel as used in the preceding example were introduced 380 g of a dimethylpolysilane $(Me_2Si)_n$ and 3.8 g of B-trimethyl-N-triphenyl borazine and the mixture was heated in an atmosphere of nitrogen gas. When the temperature of the mixture in the flask had reached about 300° C., distillation of volatile matter began indicating initiation of the thermal decomposition polymerization in the mixture which was converted into a clear liquid. The temperature of the reaction mixture was further increased gradually up to 400° C. taking care to decrease the evolution of the volatile matter as far as possible and the reaction was continued at this temperature for additional 2 hours followed by cooling to give 232 g of a clear, light yellowish green resinous material melting at 180° to 187° C. and containing 46.7% of silicon, 0.14% of boron and 0.20% of nitrogen with the silicon to boron molar ratio of 129:1. The above mentioned yield of this resinous product was 60.4% of the theoretical value.

The number-average molecular weight of this polymer was 2650 and the infrared absorption spectrum thereof had characteristic absorption bands appearing at the wave lengths of 2100 cm$^{-1}$ assignable to Si—H, 1390 cm$^{-1}$ assignable to B—N, 1260 cm$^{-1}$ assignable to Si—Me, 1030 and 1330 cm$^{-1}$ assignable to Si—CH$_2$—Si and 1820 cm$^{-1}$ assignable to B—C with the intensity ratio of Si—H at 2100 cm$^{-1}$ to Si—Me at 1260 cm$^{-1}$ equal to 0.973.

EXAMPLE 3

Into the same reaction vessel as used in Example 1 were introduced 100 g of the liquid methylpolysilane obtained in Preparation 2 and 20 g of B-tri(trimethylsilylmethyl)-N-trimethyl borazine of the formula (Me$_3$SiCH$_2$BNMe)$_3$ and the mixture was heated with agitation in an atmosphere of nitrogen gas. When the temperature of the reaction mixture had reached about 250° C., distillation of volatile matter began to indicate the initiation of the thermal decomposition polymerization. The temperature of the reaction mixture was further increased up to 350° C. and the reaction was continued at this temperature for additional 2 hours followed by cooling to give 85.0 g of a clear, yellowish green resinous material melting at 190° to 205° C. and containing 47.8% of silicon, 2.01% of boron and 2.57% of nitrogen with the molar ratio of silicon to boron of 9.2:1 indicating that the reaction of the borazine compound was almost complete. The above mentioned yield of the polymer product was 71% of the theoretical value.

The number average molecular weight of this polymer product was 1960 and the infrared absorption spectrum thereof had the characteristic absorption bands assignable to Si—H, B—N, Si—Me and Si—CH$_2$—Si with the intensity ratio of Si—H at 2100 cm$^{-1}$ to Si—Me at 1260 cm$^{-1}$ equal to 0.506. No characteristic absorption band assignable to the benzene nucleus was found as a matter of course.

EXAMPLES 4 to 9

The reaction in each of these Examples was performed in the same reaction vessel as used in Example 1 using the polysilane compound and the borazine compound as indicated in Table 1 below under the reaction conditions also indicated in the same table.

In the chemical formulas given in Table 1, the symbols Me, Et, Vi and Ph each denote a methyl, ethyl, vinyl and phenyl group, respectively. The results of the reactions are shown in the same table. The infrated absorption spectra of these product polymers in the Examples had the characteristic absorption band at 1390 cm$^{-1}$ assignable to B—N and the spectra of the polymers obtained in Examples 4 to 8 had the characteristic absorption band at 1820 cm$^{-1}$ assignable to B—C. The intensity ratios of the Si—H to Si—Me were 0.510, 0.951, 0.705, 0.893, 1.021 and 0.696 in Examples 4 to 9, respectively.

Figure 3:
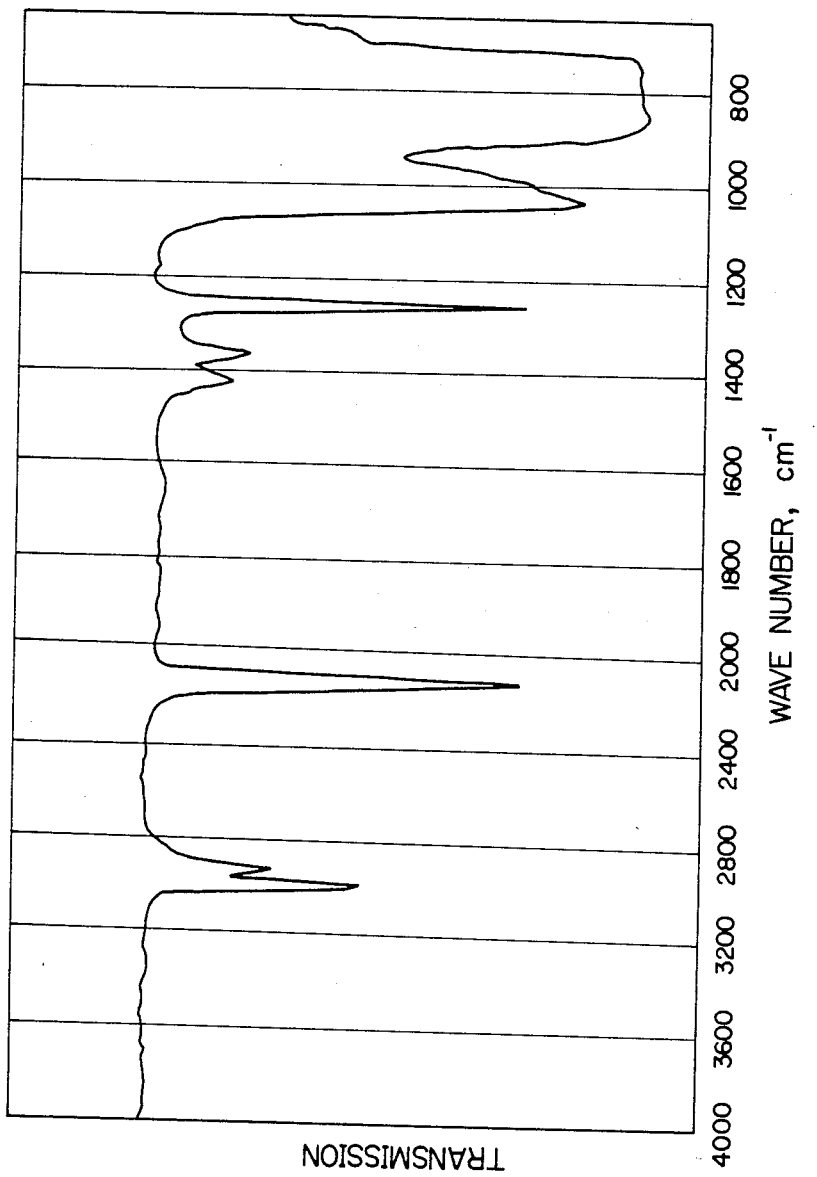
FIGS. 3 and 4 are the infrared absorption spectrum and the elution diagram in the gel permeation chromatography, respectively, of the reaction product obtained in the comparative experiment after Examples 4–9.
Figure 4:
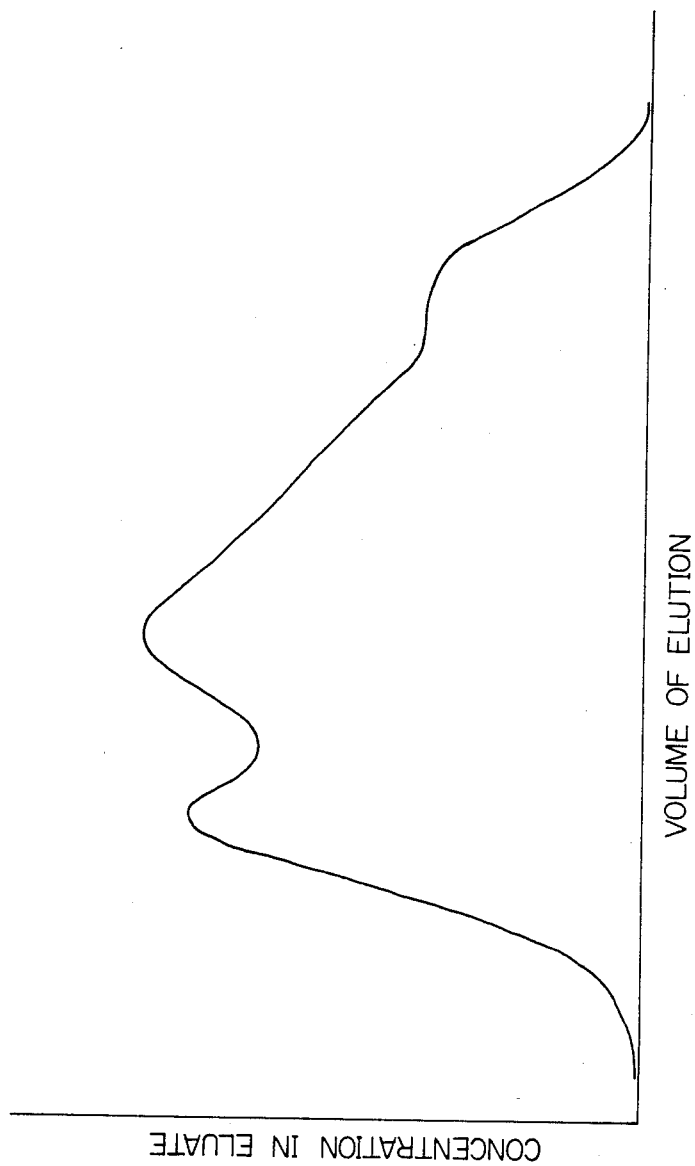

For comparison, the dimethylpolysilane alone was heated under the conditions indicated in the bottom line of Table 1 to form a polycarbosilane of which the yield, melting point and number-average molecular weight are also shown in the table. In this case, the yield of the polymer was low even after a prolonged reaction at a remarkably higher reaction temperature than in the inventive Examples. The infrared absorption spectrum of this comparative polymer shown in FIG. 3 had a strong absorption band assignable to Si—H and the intensity ratio of the Si—H to Si—Me therein was 1.040. The elution diagram in the gel permeation chromatography of this polymer is shown in FIG. 4.

TABLE 1

| Example No. | Polysilane compound (taken, g) | Boron compound (taken, g) | Reaction temperature, °C. | Reaction time, hours | Yield, % | Melting point, °C. | Si/B molar ratio | Number-average molecular weight |
|---|---|---|---|---|---|---|---|---|
| 4 | —(SiMe$_2$)$_n$— (200) | (MeBNPh)$_3$ (40) | 330 | 4 | 70.5 | 162–170 | 16.1/1 | 2,670 |
| 5 | —(SiMe$_2$)$_n$— (200) | (ViBNPh)$_3$ (10) | 380 | 3 | 63.7 | 158–165 | 26.3/1 | 2,260 |
| 6 | —(SiMe$_2$)$_n$—(SiMePh)$_m$— (200) | (EtBNPh)$_3$ (20) | 360 | 3 | 68.3 | 182–191 | 11.5/1 | 1,850 |
| 7 | (Preparation 2) (200) | (MeBNPh)$_3$ (10) | 370 | 2 | 66.5 | 172–181 | 27.1/1 | 1,930 |
| 8 | (Preparation 2) (200) | (Me$_3$SiCH$_2$CH$_2$BNPh)$_3$ (2) | 400 | 2 | 62.0 | 145–157 | 13.5/1 | 2,030 |
| 9 | —(SiMe$_2$)$_n$— (100) | (NH$_2$BNPh)$_3$ (10) | 350 | 2 | 69.5 | 141–149 | 12.6/1 | 2,240 |
| Comparative Example | —(SiMe$_2$)$_n$— (200) | None | 460 | 3.5 | 32.5 | 148 160 | — | 2,120 |

What is claimed is:

1. An organoborosilicon polymer comprising a first type of the recurring monomeric units represented by the general formula —SiR$^1$$_2$—CH$_2$—, in which R$^1$ is a hydrogen atom or a monovalent hydrocarbon group selected from the class consisting of methyl, ethyl, vinyl and phenyl groups, and a second type of the recurring monomeric units represented by the general formula —BR$^2$—NR$^3$—, in which R$^2$ is a group selected from the class consisting of monovalent hydrocarbon groups, trihydrocarbylsilyl-substituted alkyl groups represented by the general formula —CH$_2$)SiR$^4$$_3$, R$_4$ being a monovalent hydrocarbon group and n being a positive integer, and substituted or unsubstituted amino groups represented by the general formula —NR$^5$$_2$, R$^5$ being a hydrogen atom or a monovalent hydrocarbon group, and R$^3$ is a monovalent hydrocarbon group.

2. The organoborosilicon polymer as claimed in claim 1 wherein the molar ratio of the silicon atoms to the boron atoms is in the range from 2:1 to 200:1.

3. A method for the preparation of an organoborosilicon polymer as claimed in claim 1 which comprises reacting an organosilicon compound having, in a molecule, at least one silicon-to-silicon linkage and at least one group denoted by R$^1$, in which R$^1$ is a hydrogen atom or a monovalent hydrocarbon group selected from the class consisting of methyl, ethyl, vinyl and phenyl groups, bonded to the silicon atom and an organoboron compound composed of the units represented by the general formula —BR$^2$—NR$^3$—, in which R$^2$ is a group selected from the class consisting of monovalent hydrocarbon groups, trihydrocarbylsilyl-substituted alkyl groups represented by the general formula —CH$_2$)$_n$SiR$^4$$_3$, R$^4$ being a monovalent hydrocarbon group and n being a positive integer, and substituted or unsubstituted amino groups represented by the general formula —NR$^5$$_2$, R$^5$ being a hydrogen atom or a monovalent hydrocarbon group, and R$^3$ is a monovalent hydrocarbon group, in an inert atmosphere at a temperature in the range from 250° to 500° C.

4. The method as claimed in claim 3 wherein the organoboron compound is an organoborazine compound represented by the general formula (—BR$^2$—NR$^3$—)$_3$, wherein R$^2$ and R$^3$ each have the same meaning as defined above.

* * * * *